(12) United States Patent
Tealdi et al.

(10) Patent No.: US 8,006,586 B2
(45) Date of Patent: Aug. 30, 2011

(54) ARTICULATED ROBOT WRIST

(75) Inventors: Igor Tealdi, Grugliasco (IT); Mauro Amparore, Grugliasco (IT)

(73) Assignee: Comau S.p.A., Grugliasco, (Turin) (IT)

( * ) Notice: Subject to any disclaimer, the term of this patent is extended or adjusted under 35 U.S.C. 154(b) by 840 days.

(21) Appl. No.: 12/007,311

(22) Filed: Jan. 9, 2008

(65) Prior Publication Data

US 2008/0223170 A1 Sep. 18, 2008

(30) Foreign Application Priority Data

Mar. 12, 2007 (EP) .................................. 07425140

(51) Int. Cl.
*B25J 17/02* (2006.01)

(52) U.S. Cl. ............... 74/490.02; 74/490.03; 74/490.06; 901/29

(58) Field of Classification Search ............... 74/490.03, 74/490.05, 490.06, 490.02; 901/15, 17, 23, 901/25, 26, 29
See application file for complete search history.

(56) References Cited

U.S. PATENT DOCUMENTS 7,597,025 B2 * 10/2009 Narita et al. ............... 74/490.02

FOREIGN PATENT DOCUMENTS

| EP | 0 074 882 | 3/1983 |
|---|---|---|
| EP | 0 502 832 | 9/1992 |
| EP | 0 873 826 | 10/1998 |
| EP | 1 415 774 | 5/2004 |
| JP | 10-166292 | 6/1998 |
| JP | 2005-169489 | 6/2005 |
| WO | 97/47441 | 12/1997 |
| WO | WO 2007/037131 | 4/2007 |

OTHER PUBLICATIONS

European Search Report for EP 07 42 5140 mailed Jul. 12, 2007.
Extended European Search Report issued Jul. 22, 2008.

* cited by examiner

*Primary Examiner* — William C Joyce
(74) *Attorney, Agent, or Firm* — Nixon & Vanderhye P.C.

(57) ABSTRACT

An articulated robot includes a wrist carrying a flange for attachment of an apparatus to be carried by the robot. The wrist comprises a first support mounted on a robot component that is rotatable about a first axis, a second support rotatably mounted on the first support about a second axis inclined with respect to the first axis, and a third support rotatably mounted on the second support about a third axis, inclined with respect to the second axis. A first motor carried by the first support drives the rotation of the second support, and a second motor carried by the second support drives the rotation of the third support, which ends with the flange for attachment of the apparatus to be carried by the robot.

7 Claims, 6 Drawing Sheets

ARTICULATED ROBOT WRIST

BACKGROUND OF THE INVENTION

The present invention relates to an articulated robot wrist, comprising:
 a first support that is to be mounted on a robot component that is rotatable about a first axis;
 a second support mounted on said first support in a rotatable way about a second axis inclined with respect to said first axis;
 a first motor, carried by said first support, the shaft of which is connected in rotation to said second support via a first gear transmission;
 a third support, mounted on said second support in a rotatable way about a third axis inclined with respect to said second axis; and
 a second motor, the shaft of which is connected in rotation to said third support via a second gear transmission.

A robot wrist of the type referred to above has formed the subject of the Italian patent application No. TO1996A000061.

The known solution referred to above presented all the characteristics defined previously. A particularly advantageous peculiarity of said solution was the possibility of having available, within the structure of the wrist, cables and/or ducts for supply of electrical energy and/or fluids to the equipment mounted on the wrist of the robot itself. In order to obtain this characteristic, the two motors were mounted in a retracted area of the first support, far from the end of the wrist carrying the equipment. The motions of rotation coming from the motors were transferred to the second support and the third support by means of a transmission system comprising hollow concentric transmission shafts that presented at their ends cylindrical and bevel gears, members for transmission of the motion, and rolling-bearing supporting elements.

The fabrication of a wrist according to the known solution thus implied the use of a large number of components, which rendered the transmission extremely costly and complicated. Furthermore, the precision of the movements suffered from the superposition of effects due to the possible play between the elements of the different transmissions.

In order to simplify the known solution described above, the subject of the present invention is an articulated robot wrist of the type referred to at the outset, characterized in that said second motor is carried by said second support.

Said particular arrangement, by producing an advance of the motors towards the respective controlled members, enables a drastic reduction in the number of the components of the transmission, albeit keeping free within the wrist the cavity pre-arranged for passage of the cables and/or supply ducts.

According to a particularly advantageous embodiment, each motor transmits the motion to the corresponding support by means of the use of a single gear pair.

BRIEF DESCRIPTION OF THE DRAWINGS

Further characteristics and advantages of the invention will emerge from the ensuing description with reference to the annexed plate of drawings, which is provided purely by way of non-limiting example and in which.

DETAILED DESCRIPTION OF THE INVENTION

Figure 1:
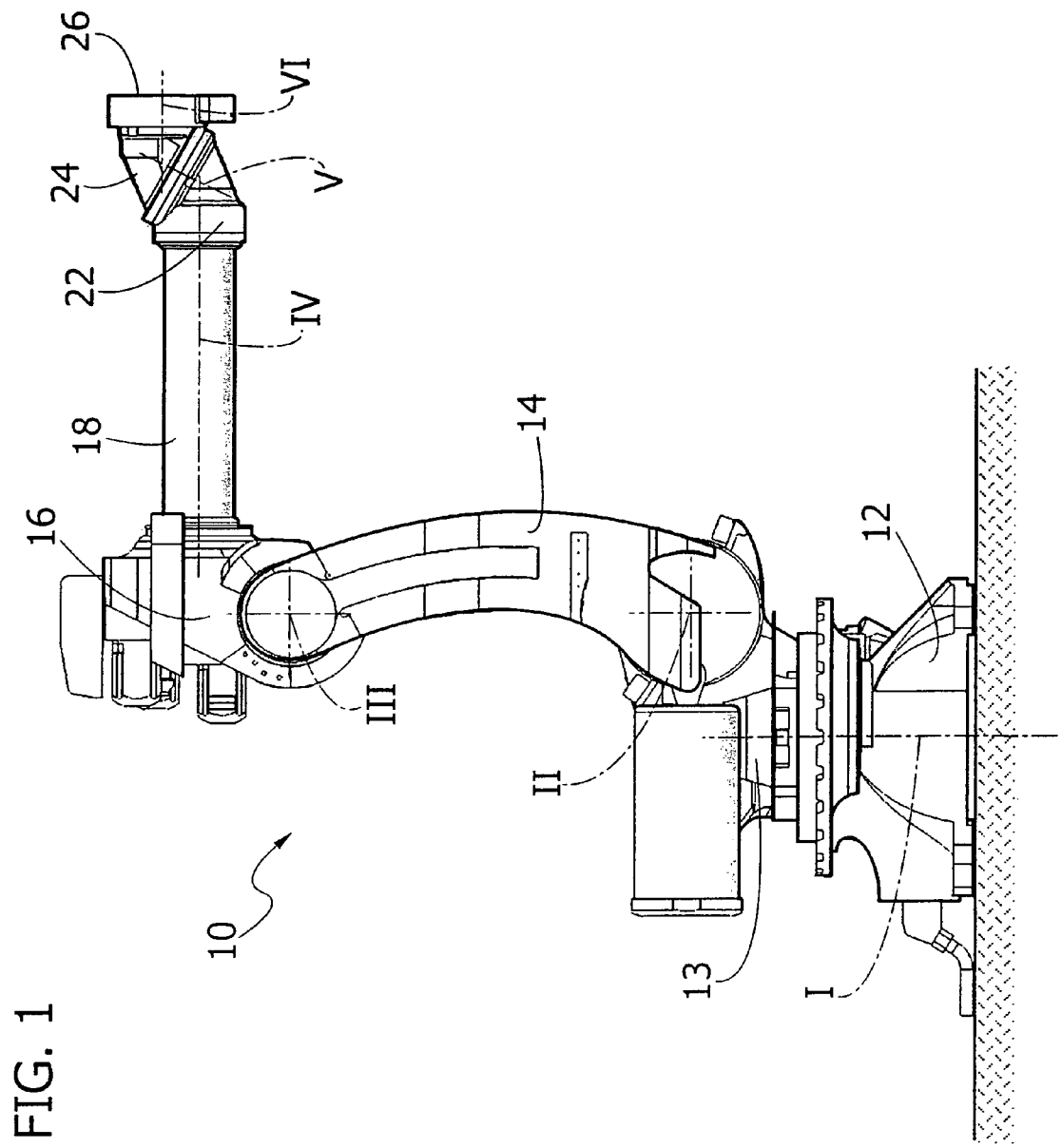
FIG. 1 is a view in elevation of an example of embodiment of the robot according to the known art.

Represented in FIG. 1 is an anthropomorphic robot of a known type, which is described hereinafter in its essential parts only to define the context of use of the wrist according to the invention, but it is evident that said wrist can be mounted also on different robots.

In the case of the example illustrated, the robot 10 represented in FIG. 1 has a base structure 12 that supports an upright 13 in a rotatable way about a vertical axis I. The upright 13 in turn supports a vertical arm 14 in a rotatable way about a horizontal axis II. The top end of the vertical arm 14 in turn supports, in a rotatable way about a horizontal axis III, a structure 16 carrying an arm 18. The arm 18 is supported by the structure 16 in a rotatable way about an axis IV that coincides with the principal axis of the arm.

Figure 2:
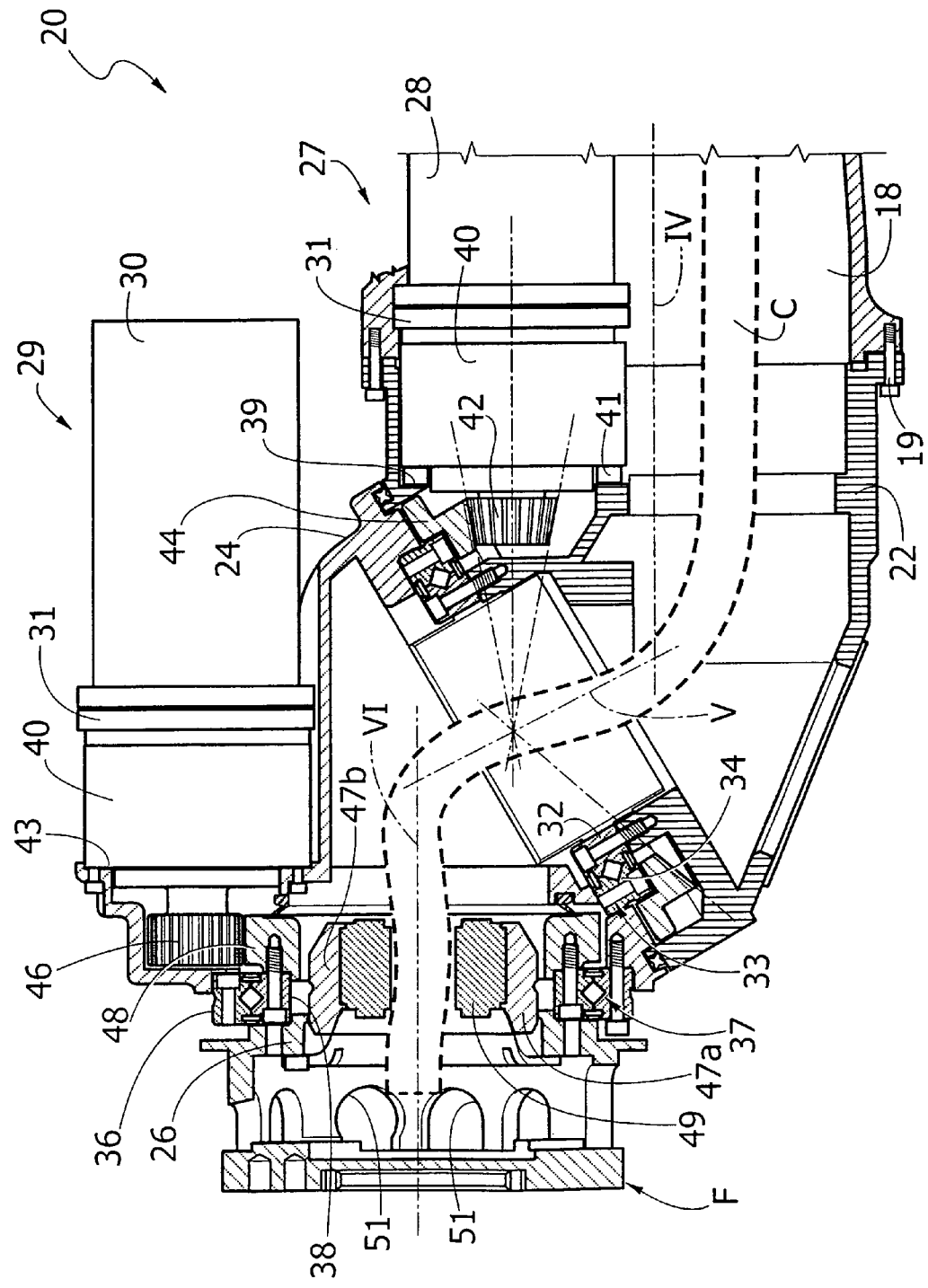
FIG. 2 is a cross-sectional side view of a first embodiment of the robot wrist according to the invention.

With reference to FIG. 2, the number 20 designates as a whole the articulated robot wrist. The articulated robot wrist is constituted by a first support 22 rigidly connected to the arm 18 of the robot by means of screws 19. A second support 24 is carried by the first support 22 and is rotatable about an axis V inclined with respect to the axis IV. In turn the second support 24 carries a third support 26 in a rotatable way about an axis VI inclined with respect to the axis V.

Provided at the joint between the arm 18 and the first support 22 is a housing for a first motor 28. According to the dimensions of the first support 22 and its cylindrical portion that is to be coupled to the arm 18 of the robot, the housing for the first motor 28 can be entirely made in the first support 22 or else also partially in the arm 18 of the robot, but always in such a way that the first motor 28 is substantially comprised in the volumes defined by the geometries of the arm 18 and of the first support 22, with particular reference to the dimensions of the cross section of said arm. Provided in a position corresponding to the second support 24 is a further housing for a second motor 30.

Set between the first support 22 and the second support 24 is a rolling bearing 33 of a known type having an inner ring 32 rigidly connected to the first support 22, whilst an outer ring 34 is rigidly connected to the second support 24. A further rolling bearing 37 is provided between the second support 24 and the third support 26, with an outer ring 36 rigidly connected to the second support 24 and an inner ring 38 rigidly connected to the third support 26.

In conformance with the teachings of the European patent No. EP 0 873 826 of the present applicant, associated to the third support is a flange F for attachment of an apparatus that has radial openings 51 in order to enable passage and distribution of its supply lines. In the case, for example, where the apparatus is a gun for electric spot welding, said lines comprise the cables for electric power supply of the welding electrodes, the electrical cables for the transmission of signals at output from sensor devices associated to the welding guns, the tubes for supply of compressed air to the actuator of the welding guns (or the possible electrical cables in the case of guns actuated by electric motors), and the ducts for supply of water for cooling the electrodes.

Figure 5:
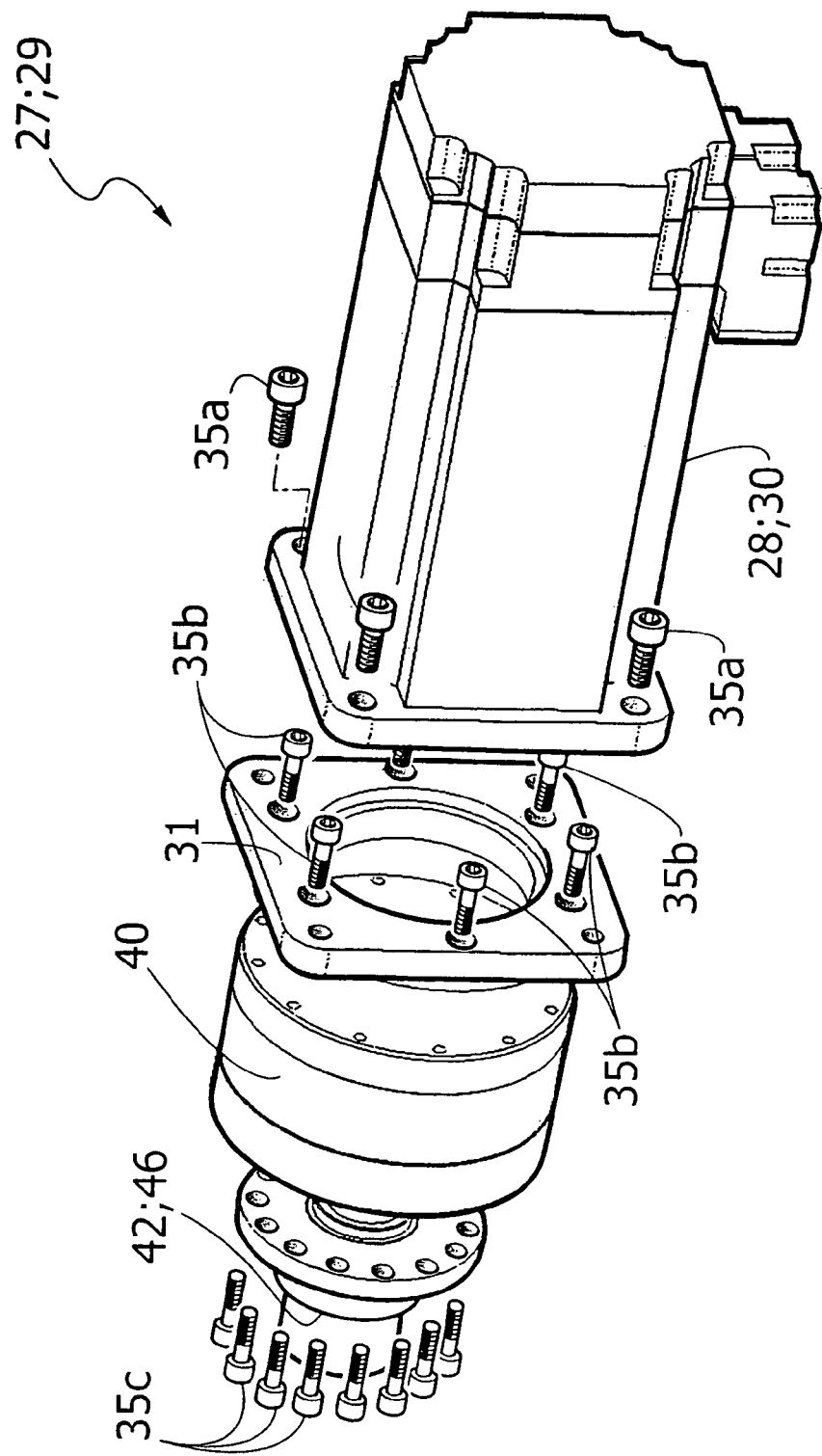
FIG. 5 is an exploded view of a motor, gear-reducer, and pinion-gear subassembly.

With reference to FIG. 5, there may be noted in greater detail the modalities of installation of each subassembly 27, 29, constituted by the motor 28, 30, a coupling flange 31, a gear reducer 40, and a pinion gear 42, 46. In order to ensure a high transmission ratio, associated to the shafts of the first motor 28 and the second motor 30 are the respective gear reducers 40. Said gear reducers 40, on account of the limitations of overall dimensions and weight that the application involves, are preferably of an epicyclic or harmonic type.

Each gear reducer 40 is coupled at one of its ends to the corresponding motor 28, 30 by means of the coupling flange 31. The coupling flange is connected, by means of screws 35a, to the motor 28, 30 and to the gear reducer by means of other screws 35b. At the other end, the gear reducer 40 carries the pinion gear 42, 46 for transmission of the motion, said pinion gear being fixed thereto by means of a plurality of screws 35c. Each subassembly 27, 29 is to be set in the corresponding housing made in the first support 22 or in the second support 24.

The first subassembly 27, which comprises the first motor 28, the gear reducer 40, and a bevel pinion 42, is fixed by means of screws so that it bears upon a bottom wall 39 of the respective housing. Set between the bottom wall 39 of the housing and the end of the gear reducer to which the bevel pinion 42 is fixed, is a flange 41 for fixing and adjustment of the play. During testing of the wrist, the bushing 41 is ground in order to bestow thereupon the exact thickness for adjustment of the tangency of the cones generating the transmission. The bevel pinion 42 meshes with the internal toothing of a bevel ring gear 44, and this, being fixed by means of screws (not represented) to the outer ring 34 of the bearing 33, is rigidly connected to the second support 24.

The second subassembly 29 comprising the second motor 30, the gear reducer 40, and a cylindrical pinion 46 is inserted in the housing made in the second support 24 and is fixed, by means of screws, so that it bears upon a bottom wall 43 of said housing. The cylindrical pinion 46 meshes with a annular gear 48, which is fixed to the inner ring 38 of the rolling bearing 37.

The motion of rotation coming from the motor 28 is converted through the gear reducer 40 and transferred to the bevel pinion 42, which draws in rotation the bevel ring gear 44 rigidly connected to the outer ring 34 of the bearing 33, which is in turn fixed to the second support 24. In this way, the rotation of the second support 24 about the axis V is obtained.

When the second motor 30 is activated, the rotation is transferred through the gear reducer 40 to the cylindrical pinion 46. The cylindrical pinion 46 meshes with the annular gear 48, which is rigidly connected to the inner ring 38 and to the third support 26. In this way, the rotation of the third support 26 about the axis VI is obtained.

Figure 6:
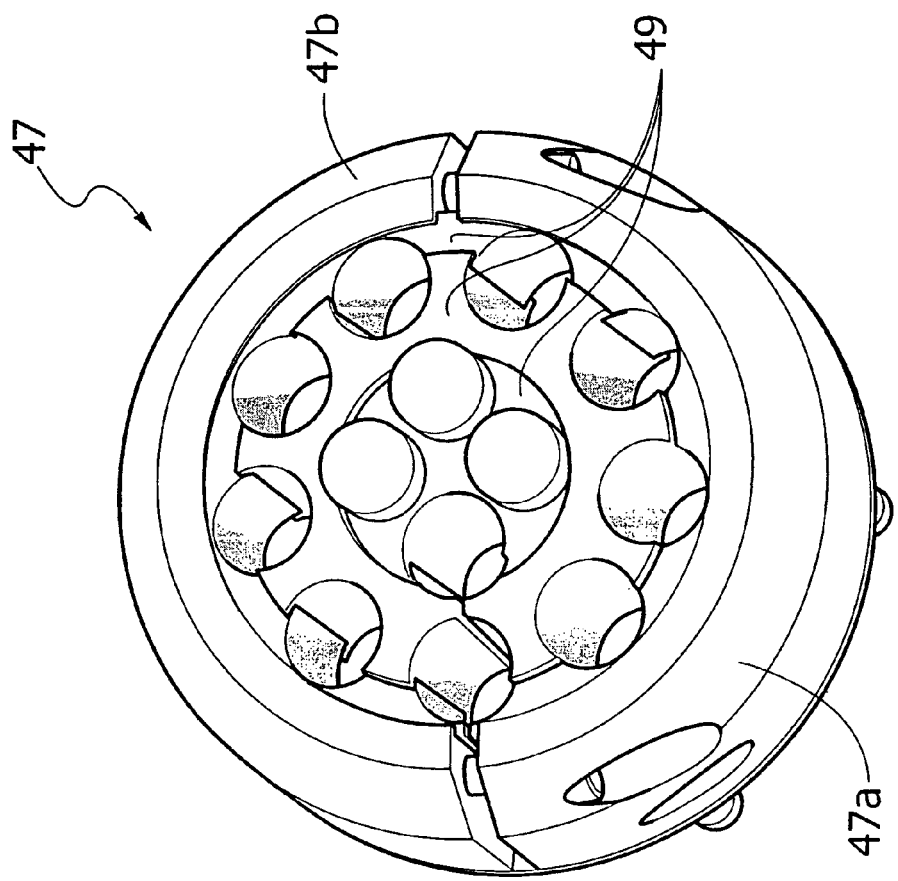
FIG. 6 is a view of a bushing for the arrangement of the cables and of the ducts within the cavity of the wrist for supply of a piece of equipment, according to the known art.

The internal cavity of the wrist enables the passage of cables and/or ducts C for supply of the apparatus (not represented) that is to be associated to the flange F. Said cables and/or ducts C are prepared prior to wiring of the robot, associating thereto a bushing 47 (illustrated in FIG. 6), formed by two half-shells 47a, 47b. The two half-shells 47a, 47b in the assembled configuration comprise perforated rubber rings 49, which support the cables and/or ducts C within the bushing 47 itself. The wiring of the robot is made by introducing the bushing 47 into the arm 18 of the robot, through the first and second supports 22, 24 of the wrist up to the third support 26, in which inclined surfaces co-operate with similar surfaces of the bushing 47 for centering. Finally, the bushing 47 is rigidly fixed to the third support 26 by means of screws.

Figure 3:
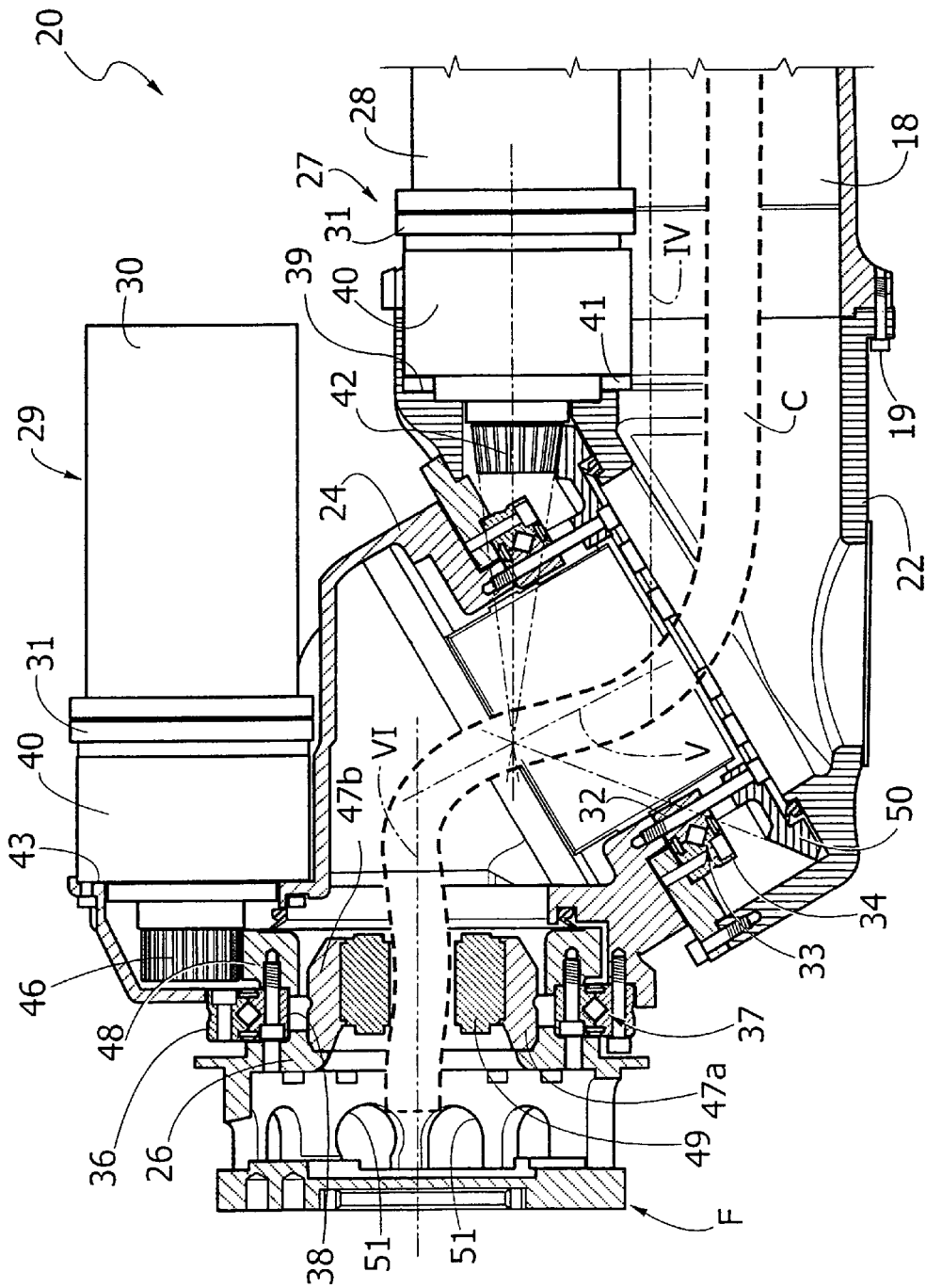
FIG. 3 is a cross-sectional side view of a second preferred embodiment according to the invention.

FIG. 3 represents another preferred embodiment of the invention. The architecture of the wrist and the arrangement of the components remains substantially identical to the embodiment of FIG. 2 but differs from this substantially only as regards the conformation of the bevel-gear pair for transmission between the first motor 28 and the second support 24. In said bevel-gear pair, in the case of the embodiment of FIG. 3, the bevel ring gear 44 is replaced by a bevel gear 50, with external toothing. This variant embodiment implies that the inner ring 32 of the bearing 33 is connected to the second support 24, whilst the outer ring 34 is connected to the first support 22.

Figure 4:
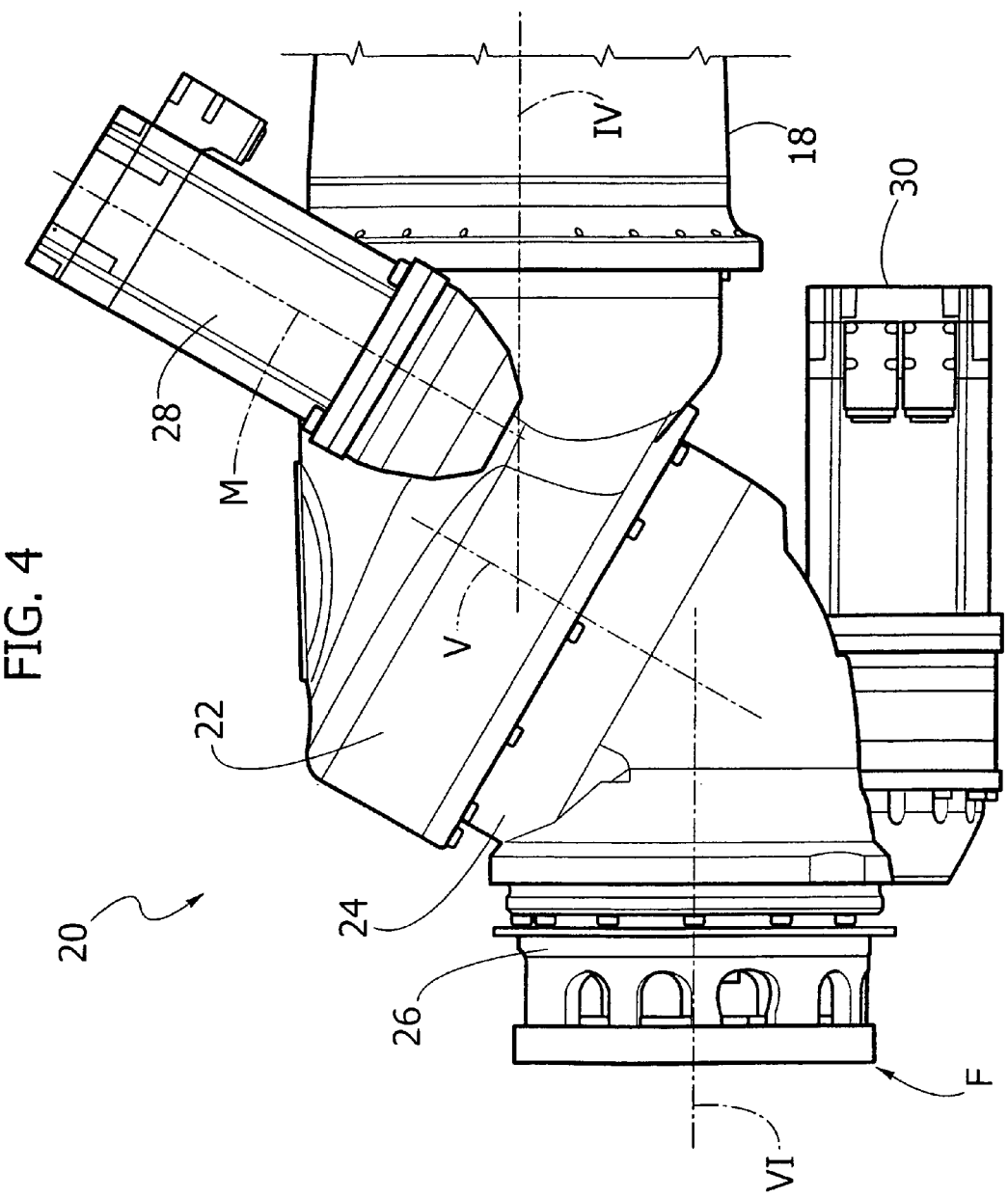
FIG. 4 is a side view of a third embodiment according to the invention.

Finally, illustrated in FIG. 4, is a further embodiment of the articulated robot wrist according to the invention. This further embodiment has the particularity of having the first motor 28 carried by the first support 22 so as to have its principal axis M parallel to the axis V of rotation of the second support 24 with respect to the first support 22. Said configuration, unlike the preceding embodiment, enables use thereof also for the first transmission of a pair of annular gears (not illustrated).

In order to control rotation of the second support 24 about the axis V, it would be possible to adopt a pair of annular gears, albeit keeping the motor 28 with its axis parallel to the axis IV, as in the case of FIGS. 2 and 3. In this case, the two annular gears would have mutually skew axes (i.e., axes that are not parallel and do not cross one another): one of the two annular gears would have its axis parallel to the axis IV and the other would have its axis parallel to the axis V. With said configuration, a proper meshing would be possible by making the annular gears with adequately shaped teeth, like, for example, the teeth of a gear with helical teeth that meshes with a wormscrew.

From the foregoing description, it is evident that the robot wrist according to the invention enables considerable simplification of the structure, with a considerable saving in the number of the corresponding components and hence of the costs in general.

Another advantage is constituted by the precision of the movements, due to the simplicity of the transmissions. The fact that the various amounts of play do not sum up is due to the fact that each actuator is housed in the support adjacent to the one that it controls.

Of course, without prejudice to the principle of the invention, the details of construction and the embodiments may vary widely with respect to what is described and illustrated herein purely by way of example, without thereby departing from the scope of the present invention.

What is claimed is:

1. An articulated industrial robot comprising:
   a robot base structure (12),
   a robot wrist (20) ending in a flange (F) for attachment of an apparatus to be carried by the robot, and
   a plurality of mutually articulated components (13,14,16, 18) linking said robot base structure (12) to said robot wrist (20),
   wherein said robot wrist (20) includes:
      a first support (22) mounted on one (18) of said robot components that is rotatable about a first axis (IV);
      a second support (24), rotatably mounted on said first support (22) about a second axis (V) which is inclined with respect to said first axis (IV);
      a third support (26) rotatably mounted on said second support (24) about a third axis (VI) inclined with respect to said second axis, said third support (24) carrying said flange (F) for attachment of said apparatus to be carried by the robot, and means for controlling rotation of said second support (24) and said third support (26) around said second axis (V) and said third axis (VI) respectively, wherein said first, second, and third axes (IV, V, VI), when located in the same plane, define a Z-like arrangement, with said first axis (IV) and said third axis (VI) being parallel to, and spaced apart from, each other, wherein said first, second and third support (22,24,26) define a continuous inner cavity for passage of a bundle (C) of cables and/or ducts for supplying the apparatus to be carried by said flange (F), and wherein said means for controlling rotation of said second support (24) and said third support (26) include:

a first motor and reducer unit (28,40), carried by said first support (22), and a first gear pair (42,44;42,50) for transmitting rotation of the output shaft of said first motor and reducer unit (28,40) to said second support (24);

a second motor and reducer unit (30,40) carried by said second support (24), and a second gear pair (46,48) for transmitting rotation of the output shaft of said second motor and reducer unit (30,40) to said third support (26).

2. A robot according to claim 1, wherein said first motor and reducer unit (28,40) has its axis located parallel to, and spaced apart from, said first axis (IV).

3. A robot according to claim 2, wherein said first gear pair (42,44;42,50) are bevel gears.

4. A robot according to claim 1, wherein said first motor and reducer unit (28,40) has its axis located parallel to said second axis (IV).

5. A robot according to claim 1, wherein said second motor and reducer unit (30,40) has its axis located parallel to said third axis (VI).

6. A robot according to claim 5, wherein said second gear pair (46,48) are cylindrical gears.

7. A robot according to claim 1, wherein each of said first and second gear pairs include a first gear carried by the output shaft of the respective motor and reducer unit and a second gear in form of annular gear, for defining a passage for said bundle (C) of cables and/or ducts.

\* \* \* \* \*